United States Patent

Friehe

[15] 3,648,989
[45] Mar. 14, 1972

[54] APPARATUS FOR THE AERATION OF LIQUIDS

[72] Inventor: Bernhard Friehe, Erpener Weg 1, 4503 Dissen T. W., Germany

[22] Filed: July 24, 1969

[21] Appl. No.: 844,304

[52] U.S. Cl. ..................................................261/91
[51] Int. Cl. .................................................B01d 7/00
[58] Field of Search ..................261/86, 87, 91; 210/219; 259/96

[56] References Cited

UNITED STATES PATENTS

| | | | |
|---|---|---|---|
| 2,802,647 | 8/1957 | Bolton | 259/96 X |
| 1,584,043 | 5/1926 | Sheppard | 261/91 X |
| 3,497,185 | 2/1970 | Dively | 261/91 X |
| 3,341,450 | 9/1967 | Ciabattari et al. | 261/91 X |
| 3,108,146 | 10/1963 | Gross | 261/87 X |
| 3,235,233 | 2/1966 | Bolton | 261/91 X |
| 3,470,092 | 9/1969 | Bernard | 261/91 X |

*Primary Examiner*—Tim R. Miles
*Assistant Examiner*—Steven H. Markowitz
*Attorney*—Bryan, Parmelee, Johnson & Bollinger

[57] ABSTRACT

An aeration unit is described to accelerate the process of biological purification in an activated sludge plant. The aeration unit includes an impeller provided with scoops oriented in a selected inclination relative to the direction of rotation of the impeller to effect an aeration and mixing of effluent and accelerate the biological purification of the effluent.

9 Claims, 5 Drawing Figures

APPARATUS FOR THE AERATION OF LIQUIDS

This invention relates to aeration units and, more particularly, to units for effecting aeration and mixing of effluent to accelerate the process of biological purification thereof in an activated sludge plant.

Biological effluent clarification plants working according to the activated sludge method possess the advantage that large volumes of effluent can be clarified within a small space. However, the process of supplying the micro-organisms in the sludge with the essential oxygen entails considerable expenditure of power. A reduction therefore in the cost of providing power for the sufficient supply and mixing of oxygen with the effluent will have a decisive effect on the economics of an activated sludge plant.

According to the present invention there is provided an aeration unit including an impeller having scoops each directed outwardly at an inclination away from a radius passing through a root portion of the scoop in the direction of rotation of the impeller and upwardly from the root position and arranged to be partly submerged in liquid to be aerated.

Aeration with an impeller rotating about an upright axis produces a proportionally greater mixing of water at reduced conveyor height and brings the stirred water in oxygenation contact with the air. In a German Pat. No. 1,205,058, an impeller type stirrer is disclosed wherein scoops of the impeller extend upwardly and outwardly. The apparatus described in this German patent generates an effluent stream having a large radial reach in comparison with its effective reach below into the effluent. As a result, the stirred up effluent is obtained over a large surface area but because of the reduced turbulence in the effluent below the surface the exchange of oxygenated effluent with the lower parts is reduced. Consequently, the oxygenation of the effluent is rendered more difficult.

It is an object of the invention to eliminate the above-described problem and to improve the oxygenation of sludge in a simple more economical manner.

The invention will now be described, by way of example, with reference to the accompanying, partly diagrammatic, drawings, in which.

Figure 1:
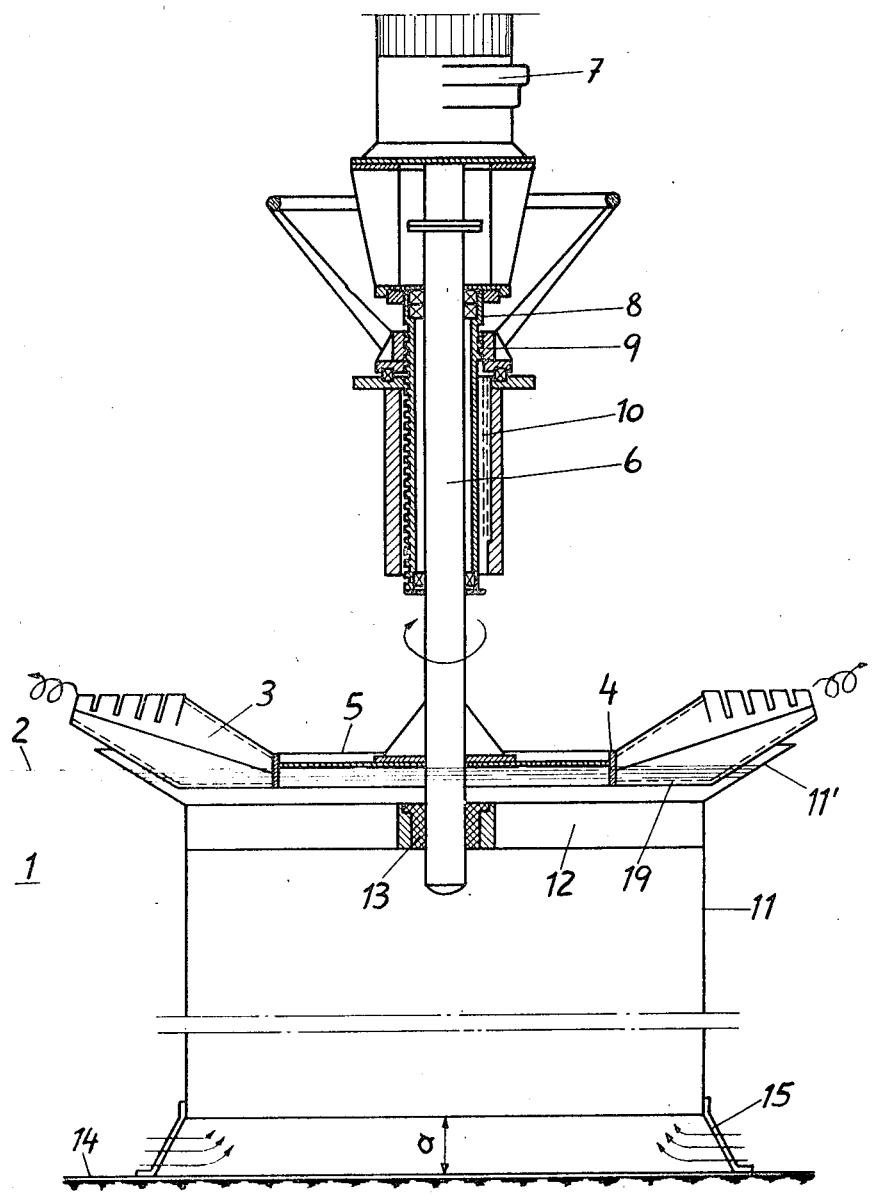
FIG. 1 is a partly sectional side elevation of an aeration unit.

Referring to FIG. 1, the aeration unit is shown in a reaction vessel 1 in which it is utilized to effect aeration and mixing of effluent to accelerate the process of biological purification of the effluent, the vessel being filled to the level 2 with activated sludge. An impeller 5 including scoops 3 mounted on a hub 4 is secured to an upright shaft 6 connected to a drive motor 7 and rotating in an upper bearing housing 8 and a lower bearing 13. The lower bearing 13, which also permits axial movement of the shaft 6, is mounted on webs 12 extending radially inwardly from an impeller housing 11 having an upper, frustoconical, portion 11' corresponding to the scoop contour and supported upon legs 15 spacing the housing from and securing the housing to the base 14 of the vessel 1. The upper bearing housing is adjustable in elevation by means of a nut 9 coacting with a threaded sleeve portion, a key 10 preventing rotation of the bearing housing relative to the external support means, and is adjusted such that the scoops are positioned with lower edge portions 19 below the level 2 of effluent by a predetermined amount.

Figure 5:
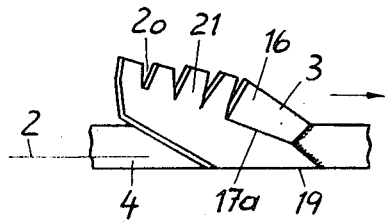
FIG. 5 is an end elevation of a scoop, as seen in the direction of the arrow of FIG. 2, but reversed in comparison with the scoops depicted in FIG. 2.

As shown in FIGS. 2 to 5, each scoop 5 is of divergent-convergent form and is constructed of a pair of folded plates 17, the inner plate 17a having widths 16 to either side of the fold line increasing in an outward direction. The plates are butt welded together at the edges of maximum width and the inner plate is welded at the root to the hub 4, with the fold line angularly displaced by an angle c from the hub radius 18 at the scoop root, and inclined upwardly from the level of the scoop root, such that the lower edges 19 extend horizontally. In one arrangement, as shown in FIG. 5, the upper side of the outer plate 17b is formed with slots 20 dividing the side into tabs 21 which are successively unbent, by amounts increasing outwardly from tab to tab, away from the lower side of the plate.

Alternatively, round or elongated apertures 22 are formed in either the upper side or in both upper and lower sides of the outer plate 17b, the edge portions of the apertures being curled over in the direction of rotation of the impeller.

In operation, the reaction vessel 1 is charged with effluent to be aerated and the level of the impeller 5 adjusted to position the lower edges 19 of the scoops 3 slightly below the level 2 of effluent by an amount determined to give minimum power consumption commensurate with sufficient absorption of oxygen. The motor 7 is then energized to rotate the impeller in the direction indicated in FIG. 3. Since the webs 12 in the impeller housing limit rotation of the liquid within the housing, effluent is picked up by the scoops and urged by centrifugal action outwardly and upwardly following the fold lines of the scoops to be discharged from the ends thereof as continuous streams. Aeration of the effluent is thus effected by the action of the streams splashing back into the body of effluent in the vessel and by the action of the staggered slots 20 or apertures 22 in the scoops which greatly encourage entrainment of air from the rear of the scoops in the manner of an ejection pump as the effluent passes thereover. Further entrainment is assisted by the effect of rotation of the impeller—which tends to build up the air pressure, and hence the oxygen partial pressure, ahead of the scoops, the form of the scoops enhancing this effect, so that the air, and oxygen, is ingested into the effluent at a pressure slightly in excess of atmospheric at a region at which the effluent flow is of a turbulent form and is most receptive to the intake of oxygen to the active micro-organisms.

With this arrangement of scoops the lower edge and side immersed in the effluent conveys a stream of the effluent upwardly after the style of an axial flow pump, whilst the upper side projecting above the surface of the effluent brings air to the stream of effluent. Enhanced oxygen absorption by the stream of the effluent is achieved due to the rotation of the impeller since the air is delivered at increased pressure and with continuous replenishment to the region of the stream of effluent where, due to the deflection at the base of the scoop, the stream is rendered turbulent and where, as a result of the turbulence, an active exchange of particles is brought about along the boundary layers of the contact areas. The size of the contact areas is made adequate in that a large part of the air is enclosed in the form of air bubbles in the eddying portion of the stream. The result of this is that at the region where the air is brought into contact with the stream of effluent the most favorable conditions possible are created to ensure a ready absorption of oxygen by the stream of effluent.

The inclination of the tips of the scoops away from the direction of rotation results in a saving of energy since it facilitates both the intake of air between the stream and the wall of the scoop and the creation of turbulence. The raising of the tips of the scoops is necessary in order to obtain the requisite level and distance of ejection of the streams.

Figure 2:
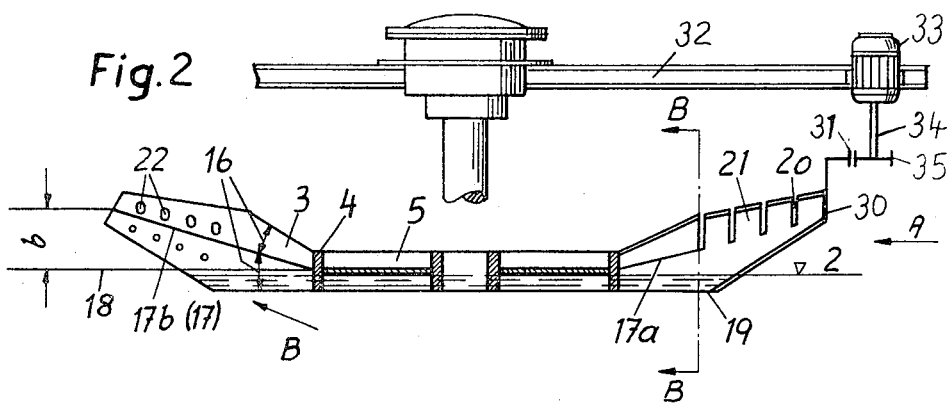
FIG. 2 is a sectional side elevation of an impeller forming a part of the unit and indicating alternative configurations for the scoops of the impeller.
Figure 3:
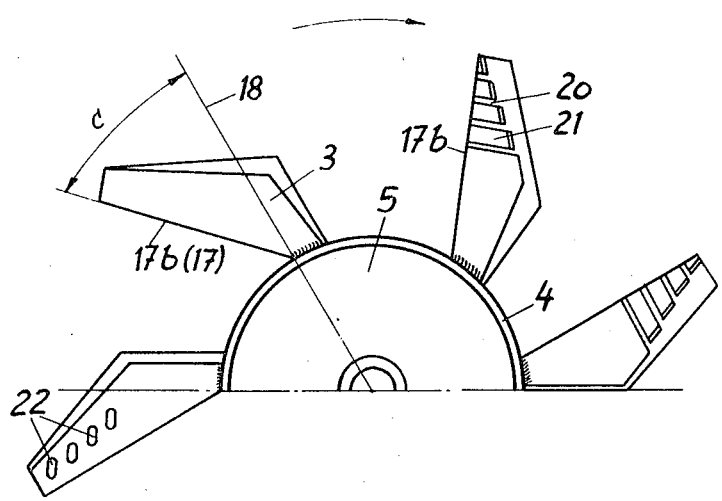
FIG. 3 is a plan view of slightly more than half of the impeller.
Figure 4:
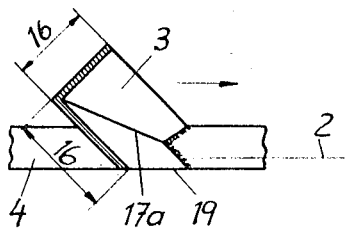
FIG. 4 is a section through a scoop of the impeller at the region of maximum width of the scoop, as at the line B—B, but is shown reversed in comparison with the impeller of FIG. 3.

In FIG. 2 is shown another device for driving of the impeller 5. The ends of the scoops 3 are provided with a rim 30 which supports a ring crown gear 31. Above the impeller is a stationary holder 32 which supports an electric motor 33. A gear 35 is fastened to a motor shaft 34 to operatively engage the ring gear 31 and drive the impeller.

Whilst the scoops have been described as being formed of flat plates, they may with advantage be formed of curved plates, the smooth contours of which enhance the entrainment and mixing of air with the effluent during flow over the plates, thereby enabling a reduction to be made in the power requirements of the plant. In an alternative embodiment, not shown, the outer ends of the scoops are connected to a rim gear wheel drivingly connected to one or more motors to drive the impeller, which for larger impellers may be economically advantageous.

What is claimed is:

1. An apparatus for aerating a liquid comprising an impeller having scoops of divergent-convergent form operatively directed outwardly at an inclination away from a radius passing through a root portion of the scoop opposite to the direction of rotation of the impeller and upwardly from the root portion and arranged to be partially submerged in liquid to be aerated, the convergent portion of each group being an outer portion having an upper side provided with spaced slots adjacent tabs with outwardly successive tabs unbent to a varying extent from tab to tab away from the lower side of the converging portion and sized to assist entrainment of air into the liquid to be aerated.

2. An apparatus for aerating a liquid comprising an impeller having scoops selectively shaped in the form of a pair of folded plates joined together so as to yield a divergent-convergent form about the fold line, said scoops being operatively arranged so that the fold line is angularly displaced backwardly away from a radius passing through a root portion of the scoop opposite to the forward direction of rotation of the impeller and inclined upwardly from the horizontal plane of the scoop root.

3. An apparatus for aerating a liquid as claimed in claim 2 wherein each scoop is of smoothly curved form.

4. An apparatus for aerating a liquid as claimed in claim 2, wherein the convergent portion of at least one of the scoops is an outer portion provided with apertures sized to assist entrainment of air into the liquid to be aerated.

5. An apparatus for aerating a liquid as claimed in claim 2, wherein the convergent portion of at least one of the scoops is an outer portion provided on its upper side with spaced slots adjacent tabs with outwardly successive tabs unbent to a varying extent from tab to tab away from the lower side of the convergent portion.

6. An apparatus for aerating a liquid as claimed in claim 2, further including means for restricting rotating of a body of liquid immediately subjacent to the scoops.

7. An apparatus for aerating a liquid as claimed in claim 2, wherein the diverging portion of each scoop has a lower side surface the plane of which extends radially outwardly and in substantially horizontal alignment from the axis of rotation.

8. An apparatus for aerating a liquid as claimed in claim 2, wherein the convergent portion of each scoop has a lower side surface the plane of which extends upwardly from the radius.

9. An apparatus for aerating a liquid as claimed in claim 2, wherein the convergent portions of the scoops extend upwardly and rearwardly of the radius in the direction of rotation of the impeller and are selectively apertured to enhance aeration of liquid scooped with the initially divergent portions of the scoops.

* * * * *